Dec. 15, 1959 R. R. STUBBE 2,917,572

AUTOMATICALLY CONTROLLED BANDWIDTH AMPLIFIER

Filed Oct. 4, 1954

WITNESSES:
E. J. McCloskey.
J J Callahan

INVENTOR
Ralph R. Stubbe.
BY F. E. Browder
ATTORNEY 2,917,572

AUTOMATICALLY CONTROLLED BANDWIDTH AMPLIFIER

Ralph R. Stubbe, Cranford, N.J., assignor to Westinghouse Electric Corporation, East Pittsburgh, Pa., a corporation of Pennsylvania Application October 4, 1954, Serial No. 460,185
8 Claims. (Cl. 178—5.4)

This invention relates to television receivers, and relates more particularly to color television receivers.

In a standard National Television Systems Committee television system, vestigial sideband transmission of both the picture carrier and the color subcarrier is employed. The carrier color signal carries one component of the color information in its phase, and another component of the color information in its amplitude. A phase reference is provided in the transmitted signal in order that receivers shall be able to measure the instantaneous phase angle of the carrier color signal so as to reproduce the desired color. This phase reference is commonly called the color burst and is transmitted at color subcarrier frequency during line retrace intervals.

In a receiver for such a system, the intermediate frequency amplifier response curve for best picture fidelity, should be so characterized that the picture carrier will fall on the curve at a point 6 decibels below the flat top peak of the curve and the color subcarrier will lie near or substantially on the flat top peak of the curve. During a period of operation of such a receiver, variations in its passband may occur, with changes in the levels of the picture carrier and the color subcarrier, with resulting loss in picture fidelity. This invention may also be used should it be desired that the intermediate frequency amplifier response curve be so characterized that the picture carrier and the color subcarrier fall on the curve at points, for example, which are each 6 decibels below the flat top peak of the curve or at other positions on the curve when the amplitudes of the two carriers are desired at the same level.

My invention automatically controls the bandwidth of such an amplifier so that the carriers are maintained at a fixed ratio of levels regardless of conditions which otherwise may have caused a variation of passband.

In one embodiment of my invention, a voltage proportional to the amplitude of the color burst is compared to another voltage which is proportional to the amplitude of the picture carrier, and the difference voltage is used to cause a reactance tube to adjust the passband of the intermediate frequency amplifier until the amplitude of the color subcarrier is normal.

An object of this invention is to maintain in an intermediate frequency amplifier, the amplitudes of two carriers at a fixed ratio of levels.

Another object of this invention is to maintain in an intermediate frequency amplifier, the amplitudes of two carriers at the same level.

Another object of this invention is to adjust the passband of an intermediate frequency amplifier of a color television receiver to cause the picture carrier and the color subcarrier to have the same amplitudes.

Figure 1:
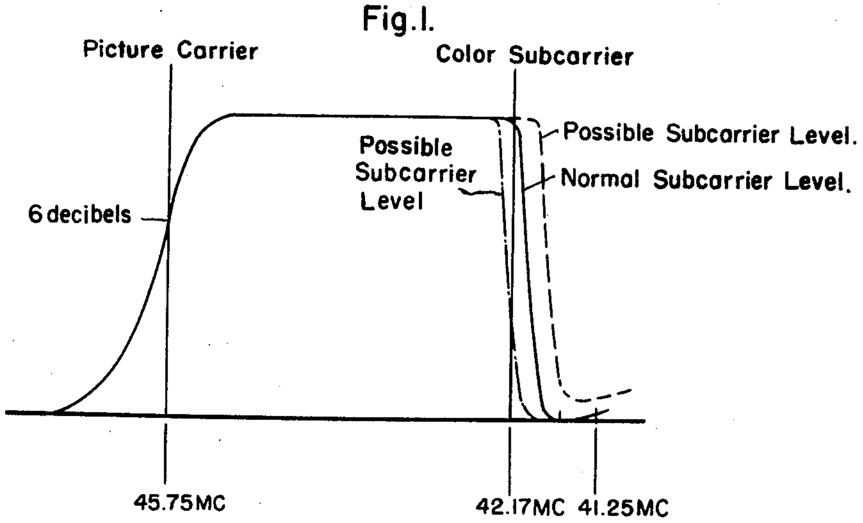
Figure 2:
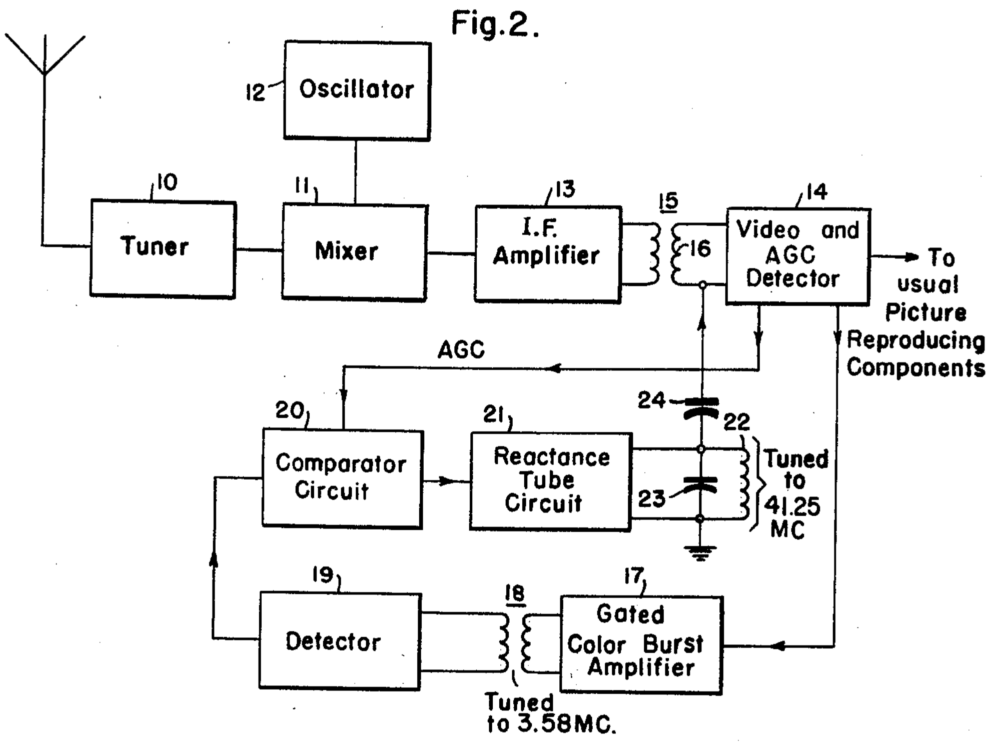

This invention will now be described with reference to the annexed drawings, of which:

Fig. 1 is a response curve of an intermediate frequency amplifier of a color television receiver showing the three conditions of normal bandwidth, greater than normal bandwidth, and less than normal bandwidth, and Fig. 2 is a block diagram of a portion of a color television receiver circuit embodying this invention.

Referring first to Fig. 1 of the drawings, the normal characteristic curve of the output of an intermediate frequency amplifier of a color television receiver is shown in a solid line, with the picture carrier falling on the slope of the curve at a point 6 decibels down from its flat top peak and the color subcarrier lying near the flat top peak of the intermediate frequency passband. The dash-dot curve portion illustrates a possible passband narrower than normal, and the dotted curve portion illustrates a possible passband wider than normal. These variations in passband cause wide variations in the level of the color subcarrier, and which prevent proper demodulation of the vestigial transmission of the color subcarrier.

My invention automatically maintains the passband in its normal condition, and will now be described with reference to Fig. 2 of the drawings.

A conventional tuner 10 supplies incoming television signals to a conventional mixer 11 to which is connected a conventional oscillator 12. The resulting beat signals at the intermediate frequency are amplified in a conventional intermediate frequency amplifier 13 and passed through an intermediate frequency transformer 15 which has a secondary winding 16 connected to a conventional video and automatic gain control detector circuit 14.

The color burst from the detector circuit 14 is amplified in the amplifier 17 and passed through the transformer 18 which is tuned to the color burst frequency of 3.58 megacycles, into the detector 19 which supplies a voltage which is proportional to the amplitude of the color burst to the comparator circuit 20. The amplifier 17 is a conventional burst amplifier which is gated on by the horizontal retrace pulses.

An automatic gain control voltage which is proportional to the amplitude of the picture carrier is taken from the automatic gain control detector and supplied to the comparator circuit 20. This comparator circuit compares the two voltages, one proportional to the amplitude of the picture carrier and the other proportional to the amplitude of the color burst, and delivers a difference voltage to the reactance tube circuit 21. The comparator circuit may be a conventional summation or adder circuit such as is commonly used in radar and television circuits.

The output of the reactance tube circuit 21 is connected to the inductor 22 which is shunted by the capacitor 23, and which is connected in series with the capacitor 24 to the intermediate frequency transformer secondary winding 16. The reactance tube circuit simulates a variable capacitor shunted across the capacitor 23. The circuit consisting of the inductor 22, the capacitors 23 and 24 and the normal capacitance of the reactance tube circuit, is tuned to 41.25 megacycles, the intermediate frequency of the sound carrier. The reactance tube circuit may be a conventional one such as is disclosed in the U.S. Patent No. 2,464,125.

In the operation of Fig. 2, an increase in the passband above normal will cause the amplitude of the sub-carrier to increase above normal, causing an increase in the voltage supplied by the detector 19 to the comparator circuit 20, and in an increase in the voltage supplied by the comparator circuit to the reactance tube circuit 21. This will cause the reactance tube circuit to increase the frequency to which the circuit comprising the inductor 22, the capacitors 23 and 24 and the normal capacitance of the reactance tube circuit, is normally tuned, and to reduce the passband of the intermediate frequency amplifier to normal.

A decrease in the passband will cause the amplitude of the color subcarrier to decrease below normal, causing a decrease in the voltage supplied by the comparator circuit to the reactance tube circuit 21. This will cause the reactance tube circuit to decrease the frequency to which the circuit comprising the inductor 22, the capacitors 23 and 24 and the capacitance of the reactance tube circuit, is tuned, and to increase the passband of the intermediate frequency amplifier to normal, thus causing the amplitude of the color subcarrier to increase to its normal value.

This invention is not limited to maintaining two carriers at the ratio of amplitudes shown in Fig. 1. The comparator circuit can be adjusted for maintaining two carriers at any desired ratio of amplitudes.

I claim as my invention:

1. A color television receiver comprising means for receiving a picture carrier and a color subcarrier including a color burst, an intermediate frequency amplifier having a response curve with the picture carrier falling on one slope of said response curve and the color subcarrier lying substantially on the flat top of said response curve, means providing two voltages, one proportional to the amplitude of the picture carrier, and the other proportional to the amplitude of the color burst, means for comparing the two voltages and for providing a difference voltage, and means employing said difference voltage for varying the bandwidth of the amplifier in such manner that the amplitudes of the carriers are maintained at a substantially fixed ratio of levels.

2. A color television receiver comprising means for receiving a picture carrier and a color subcarrier including a color burst, an intermediate frequency amplifier having a response curve on the slopes of which the two carriers fall, means providing two voltages, one proportional to the amplitude of the picture carrier, and the other proportional to the amplitude of the color burst, means for comparing the two voltages and for providing a difference voltage, and means employing the difference voltage for varying the bandwidth of the amplifier in such manner that the amplitudes of the carriers are maintained at a substantially fixed ratio of levels.

3. A color television receiver comprising means for receiving a composite video signal including a picture carrier and a color subcarrier including a color burst, an intermediate frequency amplifier having a response curve with the picture carrier falling on one slope of said response curve and the color subcarrier lying substantially on the flat top of said response curve, a video detector circuit, means connected to said circuit for developing a voltage proportional to the amplitude of the color burst, means connected to said circuit for developing another voltage proportional to the amplitude of the picture carrier, means for comparing said voltages and for providing a difference voltage, and means employing the difference voltage for tuning said amplifier to vary its bandwidth in such manner that the amplitudes of the carriers are maintained at a substantially fixed ratio of levels.

4. A color television receiver comprising means for receiving a composite video signal including a picture carrier and a color subcarrier including a color burst, an intermediate frequency amplifier having a response curve with slopes on which the two carriers fall, a video detector circuit, means connected to said circuit for developing a voltage proportional to the amplitude of the color burst, means connected to said circuit for developing another voltage proportional to the amplitude of the picture carrier, means for comparing said voltages and for providing a difference voltage, and means employing the difference voltage for tuning said amplifier to vary its bandwidth in such manner that the amplitudes of the carriers are maintained at a substantially fixed ratio of levels.

5. A color television receiver comprising means for receiving a composite video signal including a picture carrier and a color subcarrier including a color burst, an intermediate frequency amplifier having a response curve with slopes on which the two carriers fall, a video detector circuit, means connected to said circuit for developing a voltage proportional to the amplitude of the color burst, means connected to said circuit for developing another voltage proportional to the amplitude of the picture carrier, means for comparing said voltages and for providing a difference voltage, and means employing the difference voltage for tuning said amplifier to increase the bandwidth of the amplifier when the amplitude of the subcarrier is less than that of the picture carrier, and to decrease the bandwidth of the amplifier when the amplitude of the subcarrier is greater than that of the picture carrier.

6. A television receiver comprising means for receiving a signal comprising a picture carrier and another carrier including a signal burst, an intermediate frequency amplifier having a response curve on a slope of which the picture carrier falls, means for providing voltages proportional to the amplitudes of the picture carrier and the signal burst, means for comparing the voltages and for providing a difference voltage, and means employing the difference voltage for varying the bandwidth of the amplifier in such manner that the amplitudes of the two carriers are maintained substantially at a predetermined ratio of amplitude levels.

7. A television receiver comprising means for receiving a signal comprising a picture carrier and another carrier including a signal component whose amplitude is substantially constant, an intermediate frequency amplifier having a response curve on a slope of which the picture carrier falls, means for providing voltages proportional to the amplitudes of the picture carrier and the signal component, means for comparing the voltages and for providing a difference voltage, and means employing the difference voltage for varying the bandwidth of the amplifier in such manner that the amplitude of said picture carrier is maintained substantially at a predetermined level relative to that of said other carrier.

8. A television receiver comprising means for receiving a signal comprising a first carrier and a second carrier, an intermediate frequency amplifier having a response curve on a slope of which the first carrier falls, means for providing voltages proportional to the amplitudes of the first carrier and the second carrier, means for comparing the voltages and for providing a difference voltage, and means employing the difference voltage for varying the bandwidth of the amplifier in such manner that the amplitudes of the two carriers are maintained substantially at a predetermined ratio of amplitude levels.

References Cited in the file of this patent

UNITED STATES PATENTS

| | | |
|---|---|---|
| 2,635,140 | Dome | Apr. 14, 1953 |
| 2,653,187 | Luck | Sept. 22, 1953 |
| 2,798,900 | Bradley | July 9, 1957 |

OTHER REFERENCES

Introduction to Color Television, Admiral Corp., February 1953, pages 7 to 17.